(12) United States Patent
Brown et al.

(10) Patent No.: US 8,397,821 B2
(45) Date of Patent: Mar. 19, 2013

(54) CAISSON TWO-PHASE EMULSION REDUCER

(75) Inventors: Donn J. Brown, Broken Arrow, OK (US); Earl B. Brookbank, Claremore, OK (US); John L. Bearden, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 426 days.

(21) Appl. No.: 12/533,947

(22) Filed: Jul. 31, 2009

(65) Prior Publication Data

US 2011/0024124 A1   Feb. 3, 2011

(51) Int. Cl.
   *E21B 43/38* (2006.01)
(52) U.S. Cl. .................. 166/357; 166/105.5; 166/265
(58) Field of Classification Search ............ 166/105.5, 166/357, 265; 405/249
   See application file for complete search history.

(56) References Cited

U.S. PATENT DOCUMENTS

| | | | | |
|---|---|---|---|---|
| 2,104,339 | A * | 1/1938 | Arutunoff | 166/105.1 |
| 2,345,710 | A * | 4/1944 | Lybyer | 166/105.1 |
| 4,294,573 | A | 10/1981 | Erickson et al. | |
| 6,068,444 | A | 5/2000 | Sheth | |
| 6,315,131 | B1 | 11/2001 | Terrien et al. | |
| 6,357,530 | B1 | 3/2002 | Kennedy et al. | |
| 6,755,250 | B2 * | 6/2004 | Hall et al. | 166/265 |
| 6,860,921 | B2 | 3/2005 | Hopper | |

* cited by examiner

*Primary Examiner* — David Andrews
(74) *Attorney, Agent, or Firm* — Bracewell & Giuliani LLP

(57) ABSTRACT

A seafloor pump assembly is installed within a caisson that has an upper end for receiving a flow of fluid containing gas and liquid. The pump assembly is enclosed within a shroud that has an upper end that seals around the pump assembly and a lower end that is below the motor and is open. A separating device is connected to an upper end portion of the discharge pipe within the caisson. The separating device causes separation of gas from the flow containing gas and liquid to be enhanced prior to the flow reaching the operating liquid level in the caisson.

16 Claims, 4 Drawing Sheets

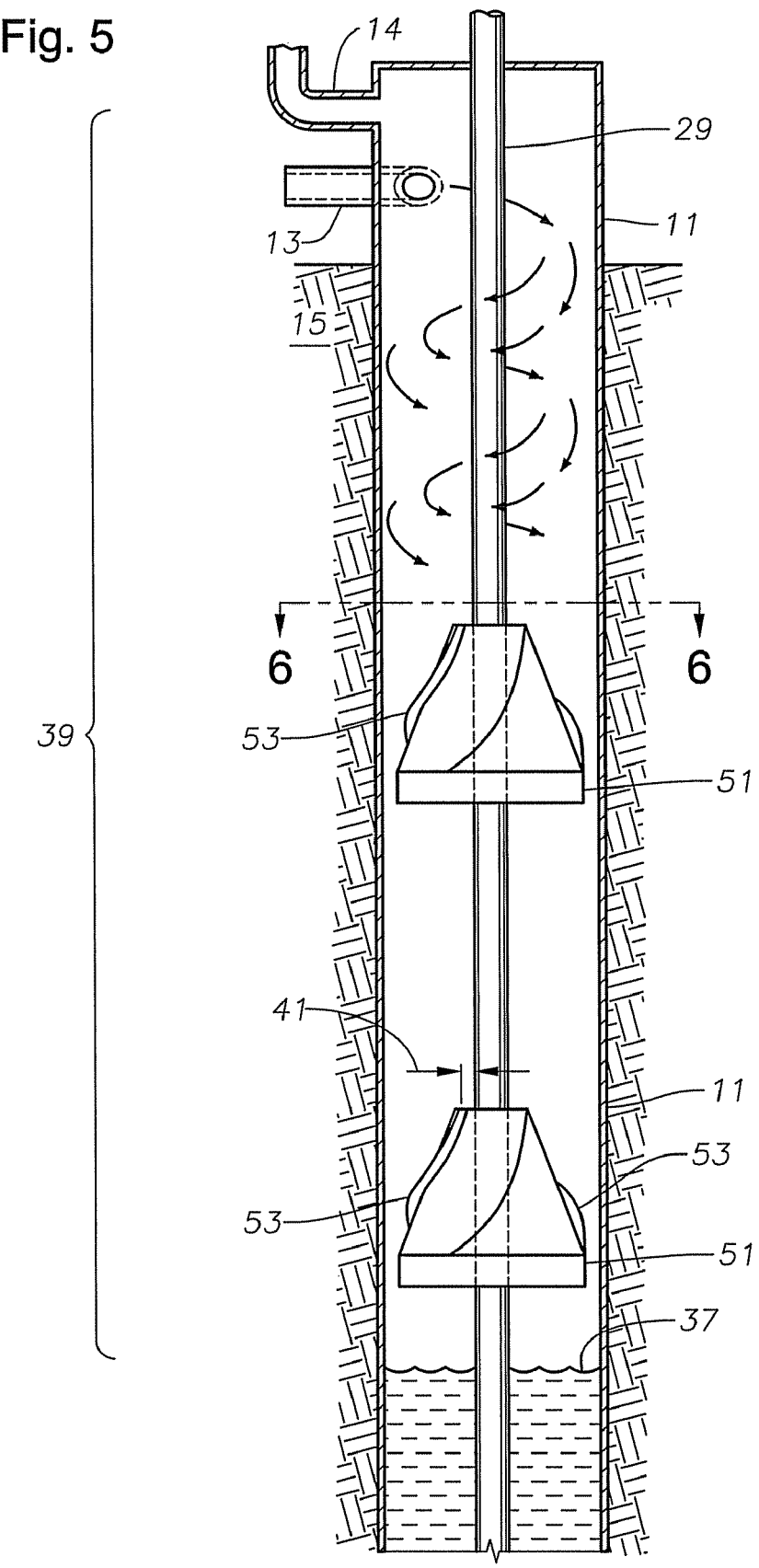

CAISSON TWO-PHASE EMULSION REDUCER

FIELD OF THE INVENTION

This invention relates in general to pumping well fluid from the seabed to the surface, and in particular to a device located within a caisson to reduce gas accumulation in the caisson.

BACKGROUND OF THE INVENTION

Offshore wells are being drilled in increasingly deeper waters. The wells may have adequate pressure to flow the well fluid to the seabed, but lack sufficient pressure to flow the fluid thousands of feet upward to a production vessel. Proposals have been made to install pumps at the seabed to boost the pressure of the well fluid sufficiently to flow it to the floating production vessel.

Often, the well fluid will be a mixture of hydrocarbon liquid, gas and water. Gas presents a problem for pumps, particularly electrically driven centrifugal pumps. Gas detracts from the efficiency of the pump, and can cause the pump to lock and shut down if a large slug of gas enters.

One proposal for dealing with well fluid having an appreciable quantity of gas is to mount the pump in a caisson. The caisson is located in a tubular bore formed into the seabed and cased to seal it from the earth formations. The caisson may be several hundred feet deep. The well fluid flows in the upper end of the caisson, and gravity causes the liquid to separate from the gas and flow downward in the caisson. The gas tends to collect in the upper portion of the caisson. The submersible pump is located within the caisson at a point where its intake is below the liquid level. The pump is enclosed by a shroud with an inlet at the lower end to force liquid to flow upward by the motor to cool the motor. As the gas cap continues to build, portions will escape and flow into the pump along with the liquid to be pumped into the surface. A possibility exists that the gas cap will grow and push the liquid level too low, resulting in a large quantity of the gas entering the pump and causing it to gas lock. Liquid level controllers have been proposed to open and close the inlet to the caisson to try to maintain the liquid at a desired level above the intake of the pump. A large gas slug could nevertheless still enter the pump and cause a gas lock.

Additionally, when a stream of liquid falls from a great height before entering a liquid pool, it causes gas to mix at the surface of the liquid pool. This in turn may cause a large amount of large and small gas bubbles to be mixed into the liquid. The smaller bubbles may then be dragged into the pump, thereby degrading the pump performance.

A need exists for a technique to control gas entrainment within a caisson to reduce the likelihood of gas entering the pump and causing a gas lock. The following technique may solve one or more of these problems.

SUMMARY OF THE INVENTION

In this invention, an apparatus for separating gas from a flow of fluid containing gas and liquid is installed within a caisson. The apparatus has a separating device connected to and surrounding a discharge pipe in a portion of the caisson containing a volume of gas. The separating device has a substantially conical body that extends radially outward and downward from the discharge pipe, thereby forming an annulus between an inner surface of the caisson and the outer surface of the conical body, allowing fluid to pass therethrough. During operation, the gas and liquid fluid enters the caisson and flows downward toward the separating device. As the fluid flows over the separating device, gas escapes from the gas and liquid fluid. The fluid flows downward and radially outward from the center of the conical body before it contacts the inner wall of the caisson. The fluid continues to flow down the inner wall of the caisson and in the annulus between the conical body and the caisson. As the fluid flows, gas escapes from the gas and liquid mixture. The separating device breaks up the fall of the fluid flow which prevents the liquid from dragging gas into the liquid at the gas liquid interface.

BRIEF DESCRIPTION OF THE DRAWINGS

FIG. 5 is an enlarged and isolated view of a portion of a caisson pump apparatus of as comprised by an alternate embodiment of the invention.

DETAILED DESCRIPTION OF THE INVENTION

Figure 1:
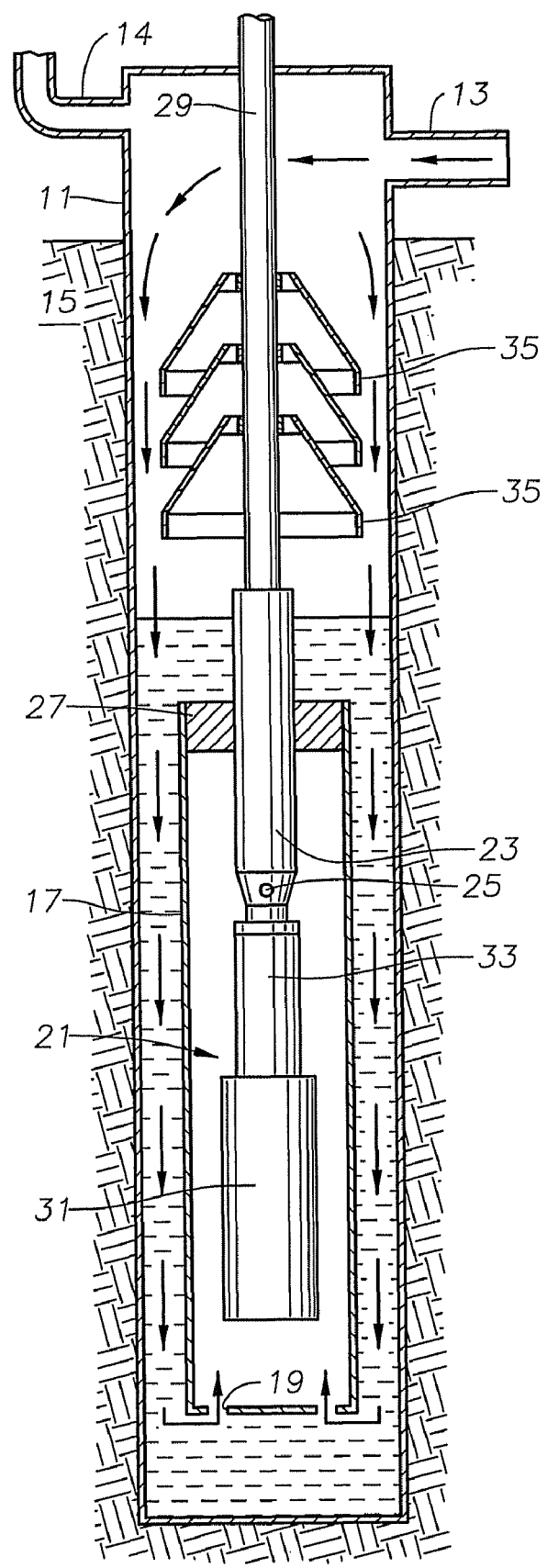
FIG. 1 is a schematic sectional view illustrating a caisson pump apparatus with a separating device as comprised by the present invention contained therein.

Referring to FIG. 1, a caisson 11 is shown schematically. Caisson 11 comprises a hole that has been formed in the seafloor to a desired depth, which may be several hundred feet. Caisson 11 is encased in a casing that is impermeable to any fluids from earth formation 15. Caisson 11 has an inlet 13 that is located near its upper end, such as slightly above the seabed. Caisson 11 has an outlet 14 that is also located near its upper end, such as slightly above the seabed.

A shroud 17 is located within caisson 11. Shroud 17 has an inlet 19 at its lower end. Shroud 17 is a tubular member that is smaller in diameter than the inner diameter of caisson 11 so as to create an annular passage surrounding it for downward fluid flow.

An electrical submersible pump assembly ("ESP") 21 is mounted within shroud 17. ESP 21 has one pump 23 in this example. Pump 23 is typically a centrifugal pump. Pump 23 is made up of a large number of stages, each having a rotating impeller and a stationary diffuser. Pump 23 has an intake 25 that is located at the lower end of pump 23 within shroud 17. Shroud 17 has an upper end 27 that seals around a portion of ESP 21 above intake 25. If desired, the entire length of ESP 21 could be enclosed by shroud 17, but the upper end 27 of shroud 17 only needs to be slightly above pump intake 25. A discharge pipe 29 extends upward from pump 23 and out the upper end of caisson 11. Although shown extending through the top of caisson 11, discharge pipe 29 could alternately extend through a sidewall portion of caisson 11. ESP 21 also has an electrical motor 31 that has a shaft (not visible) that drives pump 23. Motor 31 and pump 23 are conventionally separated by a seal section 33. Seal section 33 equalizes the pressure of lubricant contained in motor 31 with the well fluid on the exterior of motor 31.

Figure 2:
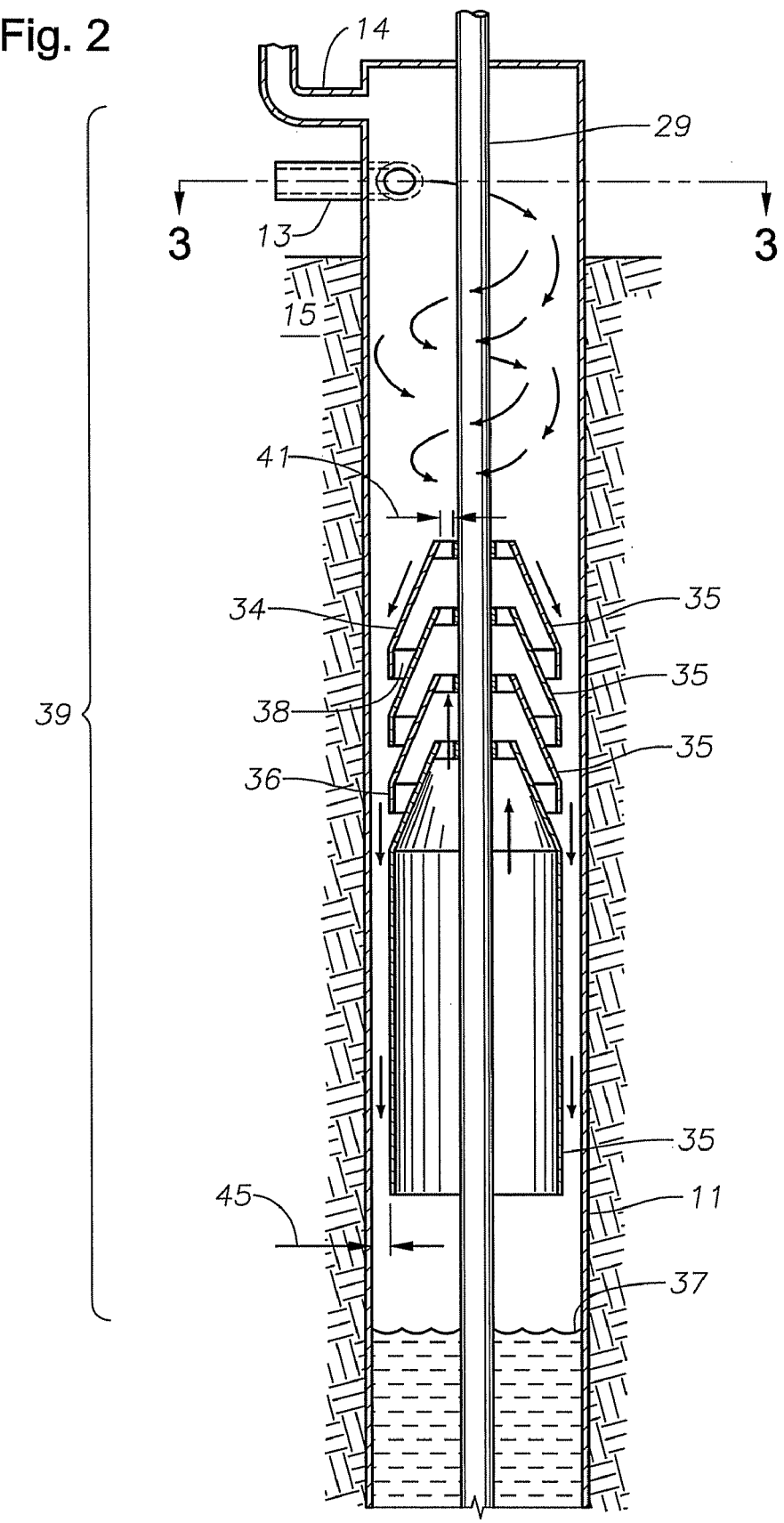
FIG. 2 is an enlarged and isolated view of a portion of a caisson pump apparatus as comprised by a first embodiment of the invention.

Referring to FIG. 2, separating devices 35 are connected to the discharge pipe 29 within the caisson 11. The separating devices 35 are generally located above the desired liquid operating level 37, in a portion 39 of caisson 11 in which a volume of gas exists. Each separating device 35 is comprised of a substantially conical body 34 that surrounds and extends downward and radially outward from discharge pipe 29. Each separating devices 35 has a cylindrical lower portion 36 that joins conical body 34. In the example of FIG. 2, the length of the cylindrical portion 36 of the lowest separating device 35 is longer than the others. The longer cylindrical portion will help prevent turbulence that may drag gas into the liquid at liquid operating level 37. In an alternate embodiment, for example, the cylindrical portion of the lowest positioned separating device may extend below the liquid operating level, further preventing turbulence as the liquid enters. Also, in the example of FIG. 2, the cylindrical portions 36 are of the same diameter. However, each separating device 35 may be of a different size and length in order to provide the desired separating effect. Separating devices 35 are mounted on pipe 29 apart from each other so that the open lower end of each is separated from the conical body 34 of the next lower separating device 35, creating an annular slot 38 between them.

Figure 3:
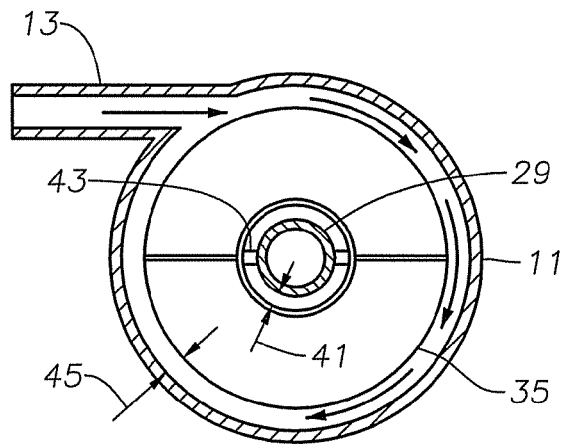
FIG. 3 is a sectional view of the caisson pump taken along the line 3-3 of FIG. 2.

As illustrated in FIG. 3, each separating device 35 is connected to the discharge pipe 29 in a manner that provides an annular area 41 between the outer surface of the discharge pipe 29 and the inner surface of the separating device 35 at the top of its conical body 34. Separating devices 35 may be formed in two halves and clamped onto the discharge pipe 29. A pair of spokes or members 43 may extend out from the discharge pipe 29 for connecting to the upper inner surface of the separating device 35, thereby defining the annular area 41. The annular area 41 allows gas to travel upward through the area as it is separated from the liquid and gas fluid mixture. A second annular area 45 is formed between the inner surface of caisson 11 and the outer surface of separating device 35. The annular area 45 allows the liquid and gas fluid mixture to flow downward through the area. Annular slots 38 (FIG. 2) allow liquid that flows downward into annular area 41 to flow downward out of each separating device 35.

Figure 4:
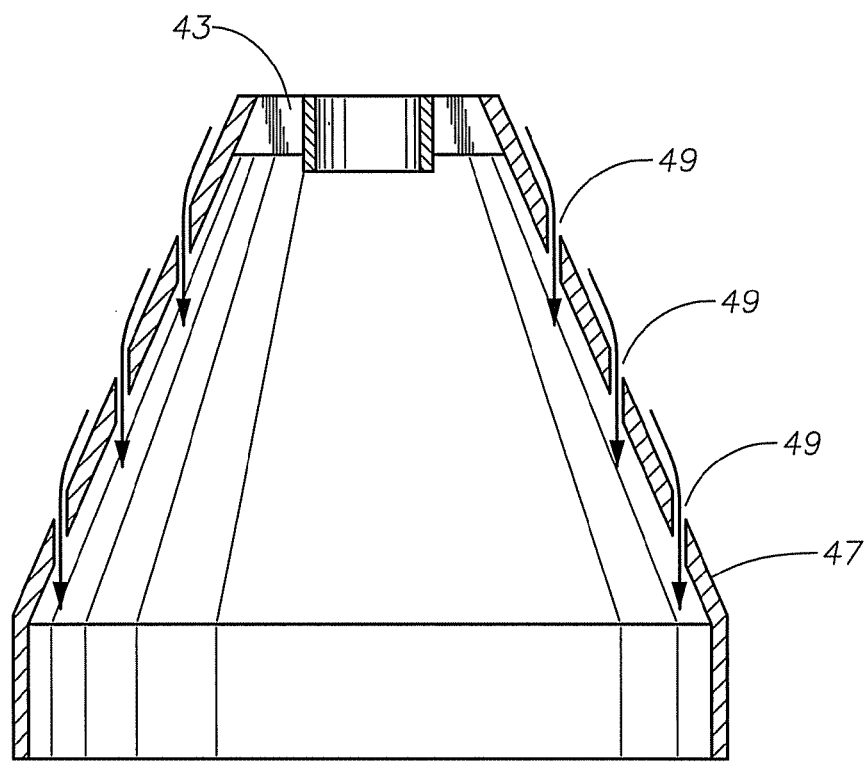
FIG. 4 is an enlarged sectional view of a separating device as comprised by an alternate embodiment of the invention.

In an alternate embodiment, as illustrated in FIG. 4, a separating device 47 may have a plurality of apertures 49 located in and extending through the conical body. Apertures 49 allow liquid to pass therethrough as the liquid and gas fluid mixture flows over and down the conical body of separating device 47. Apertures 49 are spaced around the circumference of the conical portion of separating device 47. Apertures 49 are located on a conical portion of separating device 47, and preferably, each aperture 49 has an axis that is parallel with the axis of separating device 47.

Figure 6:
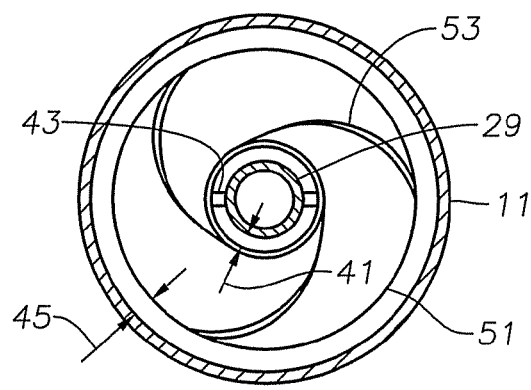
FIG. 6 is a sectional view of the caisson pump taken along the line 6-6 of FIG. 5.

In an additional alternate embodiment, as illustrated in FIGS. 5 and 6, a separating device 51 may have a plurality of raised vanes 53 extending diagonally or helically from an upper portion of the conical body to a lower portion thereof. The plurality of vanes 53 create a spiraling effect when the fluid flows over the conical body of separating device 51.

In the operation, ESP 21 is placed in shroud 17 and installed in caisson 11. Separating devices 35 are connected to the discharge pipe 29. The valve (not shown) to inlet 13 is opened, causing well fluid to flow through caisson inlet 13. The well fluid is typically a mixture of hydrocarbon liquid, water and gas. Shroud 17 is immersed in liquid in caisson 11, with liquid level 37 being at least above pump intake 25 and preferably above shroud upper end 27. Liquid level 37 will be below caisson inlet 13. A gravity separation occurs as the fluid flows in inlet 13 and downward in caisson 11. This results in gas freeing from the liquid and collecting in the upper portion of caisson 11.

In order to enhance the separation that occurs as the fluid flows in inlet 13 and downward in caisson 11, separating devices 35 are installed within the caisson 11. As illustrated in FIG. 2, there may be a series of separating devices 35 connected to the discharge pipe 29, and the separating devices 35 may be of different sizes and lengths. Separating devices 35 are passive and do not rotate. As the fluid flow contacts the separating devices 35, it slows and flows over and down the outer surface of each conical body as indicated by the arrows. Each separating device 35 directs the flow of the fluid outward to the inner wall of the caisson 11, where the flow then continues downward in the annular area 45 between the inner wall of caisson 11 and the outer surface of the conical body of each separating device 35. The naturally occurring surface tension in the liquid combines with the curved surfaces of the conical body 35 and the caisson 11 to create a Coandă like effect, causing the liquid flow to adhere to the inner walls of the caisson 11. As gas separates from the liquid and gas fluid mixture, it rises upwardly as indicated by the arrows passing through annular area 41 between the conical body of the separating device 35 and the discharge pipe 29.

As previously discussed and illustrated in FIG. 4, one or more of the separating devices connected to the discharge pipe 29 may be constructed as separating device 47. Separating device 47 operates in a similar fashion to separating device 35, directing the flow of the fluid to the inner wall of the caisson 11, where the flow then continues downward in the annular area 45 between the inner wall of caisson 11 and the outer surface of the conical body of each separating device 47. Additionally, as the liquid and gas fluid mixture flows over separating device 47, gravity forces liquid through the plurality of apertures 49 located in and extending through the conical body, and downward into a portion of the caisson 11 below. Separating device 47 can be incorporated with separating device 35. For example, the most upper positioned separating devices in a series of separating devices may incorporate separating device 47 with apertures 49 to allow for additional gravity separation to occur. However, the lowest positioned separating device may be that of separating device 35 to direct the flow outward and into contact with the inner wall of caisson 11. This allows the fluid to enter the operating liquid level below with less turbulence, thereby preventing additional mixing of gas with the liquid and gas fluid mixture.

As previously discussed and illustrated in FIGS. 5 and 6, one or more of the separating devices connected to the discharge pipe 29 may be constructed like separating device 51. Separating device 51 operates in a similar fashion to separating device 35, directing the flow of the fluid to the inner wall of the caisson 11, where the flow then continues downward in the annular area 45 between the inner wall of caisson 11 and the outer surface of the conical body of each separating device 51. Additionally, as the liquid and gas fluid mixture flows over separating device 51, vanes 53 induce or regenerate a spiraling effect in the fluid mixture. The spiraling effect of the fluid mixture enhances the gas separation from the liquid and gas fluid mixture as the fluid flow is directed to the inner wall of the caisson 11. The helical vanes of separating device 51 can be incorporated with separating devices 35, 47. For example, the most upper positioned separating device in a series of separating devices may incorporate separating device 51 with vanes 53 to induce or regenerate a spiraling effect in the fluid. The separating device below separating device 51 may be a separating device 47 with apertures 49 to allow for additional gravity separation to occur. The lowest positioned separating device may be that of separating device 35 to direct the flow outward and into contact with the inner wall of caisson 11, which allows the fluid to enter the operating liquid level below with less turbulence, thereby preventing additional mixing of gas with the liquid and gas fluid mixture. Some of the gaseous fluid will swirl upward into slots 38, with the change in direction causing liquid to separate and flow down annulus 45. Various combinations of separating devices 35, 47, 51 may be employed with the caisson 11 to reach a desired result.

After the fluid has passed over the separating devices, it flows down through the annular passage around shroud 17 and into shroud inlet 19. The liquid flows up alongside motor 31 and into pump intake 25. Pump 23 increases the pressure of the liquid and discharges it through discharge pipe 29 for flowing the liquid to the surface.

The invention has significant advantages. By providing separating devices within the gas cap portion of the caisson, gas removal from the liquid and gas fluid mixture is enhanced before the fluid mixture entering the caisson reaches the operating fluid level in the caisson. The separating device prevents large amounts of gas from being maintained in the fluid, thereby preventing large slugs of gas from entering the shroud and causing gas locking of the pump.

While the invention has been shown in only one of its forms, it should be apparent to those skilled in the art that it is not so limited but is susceptible to various changes without departing from the scope of the invention. For example, the caisson could comprise a housing located on the sea floor, rather than within a hole in the sea floor. The separating device could incorporate various numbers of conical bodies with different shapes, sizes, and features. The separating devices may incorporate spiraling vanes, apertures, smooth surfaces, or any combination thereof.

The invention claimed is:

1. An apparatus for pumping a fluid containing gas and liquid, the apparatus comprising:
 a caisson having an inlet at an upper end for receiving a flow of fluid containing gas and liquid and an outlet at the upper end for discharging gas;
 a pump within the caisson for pumping liquid from the caisson;
 a liquid discharge pipe extending vertically within the caisson, connected to an outlet of the pump on a lower end and extending upwardly through the caisson;
 a plurality of separating bodies positioned above an upper end of the pump for separating gas from liquid prior to reaching the pump, each with a downward sloping conical portion having an open lower end, an open upper end surrounding the discharge pipe and being of larger diameter than an outer diameter of the discharge pipe, defining an inner annulus; and
 the bodies being spaced apart along the discharge pipe such that the upper end of the each of the bodies is spaced below the lower end of the next upper one of the bodies.

2. The apparatus according to claim 1, wherein the bodies are spaced apart from each other along the discharge pipe a distance greater than a length of each of the bodies along an axis of the discharge pipe.

3. The apparatus according to claim 1, wherein:
 the conical portion of each of the bodies contains a plurality of raised vanes positioned along an upper surface of the conical portion, each vane extending helically; and
 the conical portion of each of the bodies is free of apertures between a lower end and the open upper end of the conical portion.

4. The apparatus according to claim 1, wherein at least one of the bodies has a cylindrical portion joining and extending downward from the lower end of the conical portion, the cylindrical portion having an open lower end and a length greater than a length of the conical portion measured along an axis of the discharge pipe.

5. The apparatus according to claim 1, wherein the open upper end of each of the bodies leads directly into the caisson for discharging gas into the caisson prior to reaching an upper one of the bodies.

6. The apparatus according to claim 1, further comprising:
 a shroud surrounding at least a portion of the pump within the caisson below the separating device, the shroud having an inlet at a lower end for receiving fluid flowing into the caisson, the shroud having an upper end located below the separating device, and the shroud having a lower end below an intake of the pump.

7. An apparatus for pumping liquid from a subsea caisson having an inlet at an upper end for receiving a flow of fluid containing gas and liquid and an outlet at the upper end for discharging gas, the apparatus comprising:
 an electric submersible pump assembly adapted to be located in the caisson;
 a shroud surrounding at least a portion of the pump assembly, the shroud having an inlet at a lower end for receiving fluid flowing into the caisson, the inlet of the shroud being below an intake of the pump assembly;
 a discharge pipe extending vertically within the caisson, connected to the pump assembly and extending upwardly through the caisson; and
 at least one passive separating device connected to and surrounding the discharge pipe above the shroud and the upper end of the pump assembly, the separating device having a body with a substantially conical portion extending outward and downward from the discharge pipe to form an outer annulus between an inner surface of the caisson and an outer surface of the body allowing fluid to pass downwardly therethrough, the body having an open lower end and an open upper end, each of the open upper and lower ends that is larger than an outer diameter of the discharge pipe, defining an inner annulus for gas to flow upwardly in the caisson, the separating device adapted to be positioned above a desired liquid operating level within a volume of gas of the caisson; wherein
 the at least one passive separating device further comprises:
 a plurality of raised vanes positioned along an outer surface of the conical portion of the body, each vane extending helically to thereby create a spiraling effect when the fluid passes over the device; and
 wherein the outer surface between the upper and lower ends is free of any apertures.

8. The apparatus according to claim 7, wherein the at least one passive separating device comprises a plurality of the bodies, spaced apart from each other along the discharge pipe a distance greater than a length of each of the bodies along an axis of the discharge pipe.

9. The apparatus according to claim 7, wherein the at least one passive separating device comprises a plurality of the bodies mounted to the discharge pipe with the open upper end of a lower one of the bodies being below the open lower end of a next upward one of the bodies.

10. The apparatus according to claim 7, wherein the at least one passive separating device further comprises:
 a cylindrical lower portion joining the conical portion of the body, the cylindrical lower portion having a length greater than a length of the conical portion measured along the discharge pipe.

11. The apparatus according to claim 7, wherein the body of the at least on passive separating device is mounted to the discharge pipe by a set of spokes.

12. A method for pumping from a subsea caisson liquid collecting within a lower portion of the caisson as a result of a fluid containing mixture of liquid and gas flowing into an upper end of the caisson, the method comprising:
(a) suspending a pump assembly within the caisson on a discharge pipe that extends up the caisson such that an intake of the pump assembly is submersed within the liquid collecting in the caisson;
(b) providing a plurality of separating devices, each having a downward sloping conical body with an open lower end, and an open upper end having a diameter larger than an outer diameter of the discharge pipe, and mounting the conical bodies around the discharge pipe above an upper end of the pump assembly and within a volume of gas in the caisson above the liquid collecting in the caisson; and
spacing the conical bodies from each other along the discharge pipe such that the upper end of each of the bodies is spaced below the lower end of the next upper one of the bodies;
(c) causing the fluid flowing into the upper end of the caisson to strike and splash on an upper surface of the conical bodies before reaching the liquid collected in the caisson, thereby separating gas from liquid in the fluid;
(d) allowing the separated gas to flow into the open lower end of the conical bodies, through the open upper end of the conical bodies, and back upward in the caisson;
(e) allowing the separated liquid to flow downward to the collecting liquid in the caisson to an inlet of the pump assembly;
(f) pumping the liquid through the discharge pipe with the pump assembly.

13. The method of claim 12, wherein step (b) comprises:
providing that the conical bodies between the open lower end and open upper end are free of apertures, so that all of the liquid separated from the fluid striking the conical bodies in step (c) flows radially outward and downward along the conical bodies.

14. The method of claim 12, wherein step (b) comprises:
providing the upper surface of the conical bodies with a plurality of raised helical vanes; and
step (b) comprises:
spiraling the fluid striking the conical bodies with the vanes thereby further separating a portion of the gas from the fluid.

15. The method of claim 12, wherein step (a) further comprises:
enclosing the pump assembly in a shroud having an inlet below the intake of the pump assembly, the shroud having an upper end below the separating devices.

16. The method according to claim 12, wherein a distance from the upper end of each of the bodies to the lower end of the next upper one of the bodies is greater than a length of each of the conical bodies measured along the discharge pipe.

\* \* \* \* \*

UNITED STATES PATENT AND TRADEMARK OFFICE
CERTIFICATE OF CORRECTION

| | | |
|---|---|---|
| PATENT NO. | : 8,397,821 B2 | Page 1 of 1 |
| APPLICATION NO. | : 12/533947 | |
| DATED | : March 19, 2013 | |
| INVENTOR(S) | : Donn J. Brown et al. | |

It is certified that error appears in the above-identified patent and that said Letters Patent is hereby corrected as shown below:

In the Claims:

Claim 12, Column 8, line 3, after "assembly;" insert --and--

Signed and Sealed this
Third Day of September, 2013

Teresa Stanek Rea
*Acting Director of the United States Patent and Trademark Office*